US005550360A

United States Patent [19]

Muraoka

[11] Patent Number: 5,550,360

[45] Date of Patent: Aug. 27, 1996

[54] AUTOMATIC ADDFARE MACHINE

[75] Inventor: Yoshinori Muraoka, Saitama-ken, Japan

[73] Assignee: Kabushiki Kaisha Toshiba, Kawasaki, Japan

[21] Appl. No.: 364,045

[22] Filed: Dec. 27, 1994

[30] Foreign Application Priority Data

Dec. 27, 1993 [JP] Japan .................................... 5-348866

[51] Int. Cl.[6] ........................................ G06K 5/00

[52] U.S. Cl. ........................................ 239/384; 235/380

[58] Field of Search .................................... 235/380, 384, 235/375, 379, 381; 302/30

[56] References Cited

U.S. PATENT DOCUMENTS 3,958,103 5/1976 Oka et al. ................................ 235/380
4,818,854 4/1989 Davies et al. ............................ 235/381
4,977,502 12/1990 Baker et al. ......................... 235/384 X
5,250,793 10/1993 Nagashima et al. .................... 235/475

FOREIGN PATENT DOCUMENTS 0214493 8/1989 Japan .................................... 235/384

*Primary Examiner*—Donald T. Hajec
*Assistant Examiner*—Thien Le Minh
*Attorney, Agent, or Firm*—Cushman, Darby & Cushman

[57] ABSTRACT

An automatic addfare machine of the present invention receives plural passenger tickets inserted by a user for the fare adjustment, calculates a total amount of addfare amounts of respective passenger tickets and displays it to the user. The fare adjustment process is executed based on cash or a money card inserted by the user and the displayed total amount. After the addfare processing, this automatic addfare machine issues fare adjustment tickets corresponding to the number of tickets inserted to the user after the fare adjustment process.

19 Claims, 8 Drawing Sheets

AUTOMATIC ADDFARE MACHINE

BACKGROUND OF THE INVENTION

1. Field of the Invention

The present invention relates to an automatic addfare machine which is used in traffic facilities, for instance, railways, etc.

2. Description of the Related Art

In traffic systems such as railways, passengers use tickets, commutation tickets, season tickets, etc. In such traffic systems, an automatic addfare machine has been put in practical use for relieving congestion at a fare adjustment office or a ticket examination gate for paying additional fares by passengers who have carried beyond the riding sections specified on the tickets. The fare adjustment is made by operating this automatic addfare machine by a passenger himself who is carried beyond his destination.

On an automatic addfare machine shown in the U.S. Pat. No. 5,250,793 (Nagashima et al.), when a passenger who is carried beyond his destination inserts a ticket or a season ticket into the machine for making the fare adjustment, an amount of deficit (an addfare amount) is displayed. When a sufficient amount is inserted, a ticket (a fare adjustment ticket; an exit ticket) is issued to pass through the ticket examination gate.

As a result, the passenger passes through an automatic ticket examination gate using this issued fare adjustment ticket or giving it to a ticket examiner.

In case of such an automatic addfare machine, even when a simultaneous fare adjustment is needed for plural passengers of a group or a family, it is necessary for every one of the group or family members to make the fare adjustment one by one. So, an automatic addfare machine capable of collective fare adjustment of all members by one representative has been so far demanded.

That is, on conventional automatic addfare machines, the fare adjustment is made one time for one passenger. In other words, the fare adjustment could be made for only one person by one process.

In the subway in Washington D.C., U.S.A., automatic addfare machines are used. In this subway, prepaid card type tickets are used. When a passenger who has taken the subway carrying this prepaid card type ticket inserts this ticket into the automatic ticket examination machine, the gate of the automatic ticket examination machine may close as the value of the prepaid card type ticket has been decreased and he may be not able to pass through the gate in some cases. In this case, the passenger has to use an automatic addfare machine installed in the station yard. When a passenger inserts a prepaid card type ticket having a decreased value into an automatic addfare machine, an amount of deficit is shown on a display unit. When the passenger inserts a cash equivalent to the amount of deficit into the automatic addfare machine, data equivalent to the amount of money inserted is recorded on the magnetic stripe on the prepaid card type ticket that is inserted by the passenger and the value of the prepaid card type ticket is increased. When this prepaid card type ticket with the increased value is inserted into the automatic ticket examination machine, the gate is opened and the passenger is able to go out.

However, this automatic addfare machine also had such a problem that plural fare adjustments cannot be made simultaneously similarly as described above.

SUMMARY OF THE INVENTION

It is an object of the present invention to provide an automatic addfare machine capable of performing a collective fare adjustment for plural users.

According to the present invention, there is provided an automatic addfare machine comprising first receiving means for receiving in order first and second passenger tickets being respectively recorded sectional information representing a prescribed section between a station and the other station on a route, means for reading respective sectional information recorded on the first and second passenger tickets received by the first receiving means, means for comparing the sectional information of the first and second passenger tickets read by the reading means and outputting a comparison result, means for calculating a total addfare amount of the first and second passenger tickets based on the sectional information as far as a destination station at which the addfare machine is installed when the comparison result indicates that the sectional information of the second passenger ticket coincides with the sectional information of the first passenger ticket, second receiving means for receiving currency, and means for issuing fare adjustment tickets in the number of sheets equivalent to the passenger tickets received by the first receiving means when an amount of the currency received by the second receiving means is much more than the total addfare amount.

DETAILED DESCRIPTION OF THE PREFERRED EMBODIMENTS

Hereinafter, a first embodiment of the present invention will be described with reference to the drawings.

Figure 2:
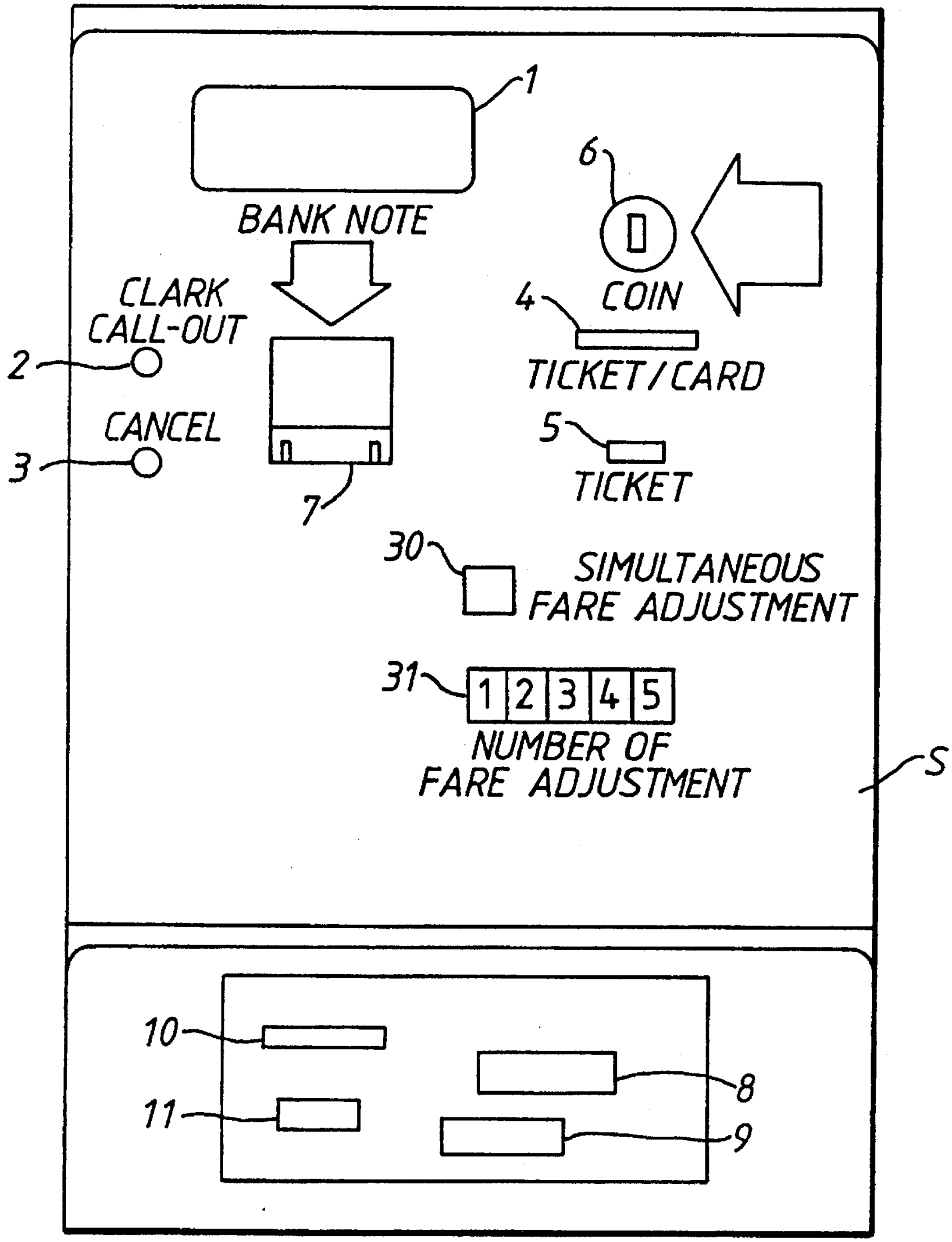
FIG. 2 is a plan view showing a user servicing panel of the automatic addfare machine shown in FIG. 1.

FIG. 2 shows a user servicing panel S of an automatic addfare machine of the present invention. On this user servicing panel S, a display unit 1, a clerk call-out button (a pushbutton switch) 2, a cancel button (a pushbutton switch) 3, a season ticket/card inserting port 4, a ticket inserting port 5, a coin inserting port 6, a bank note inserting port 7, a fare adjustment ticket issuing port 8, a change outlet 9, a season ticket/card outlet 10 and a ticket outlet 11 are provided.

The display unit 1 displays a guidance, addfare amount, etc. The clerk call-out button 2 is to call out a clerk by user. The cancel button 3 is a button that is pushed by user to cancel the fare adjustment.

Figure 1:
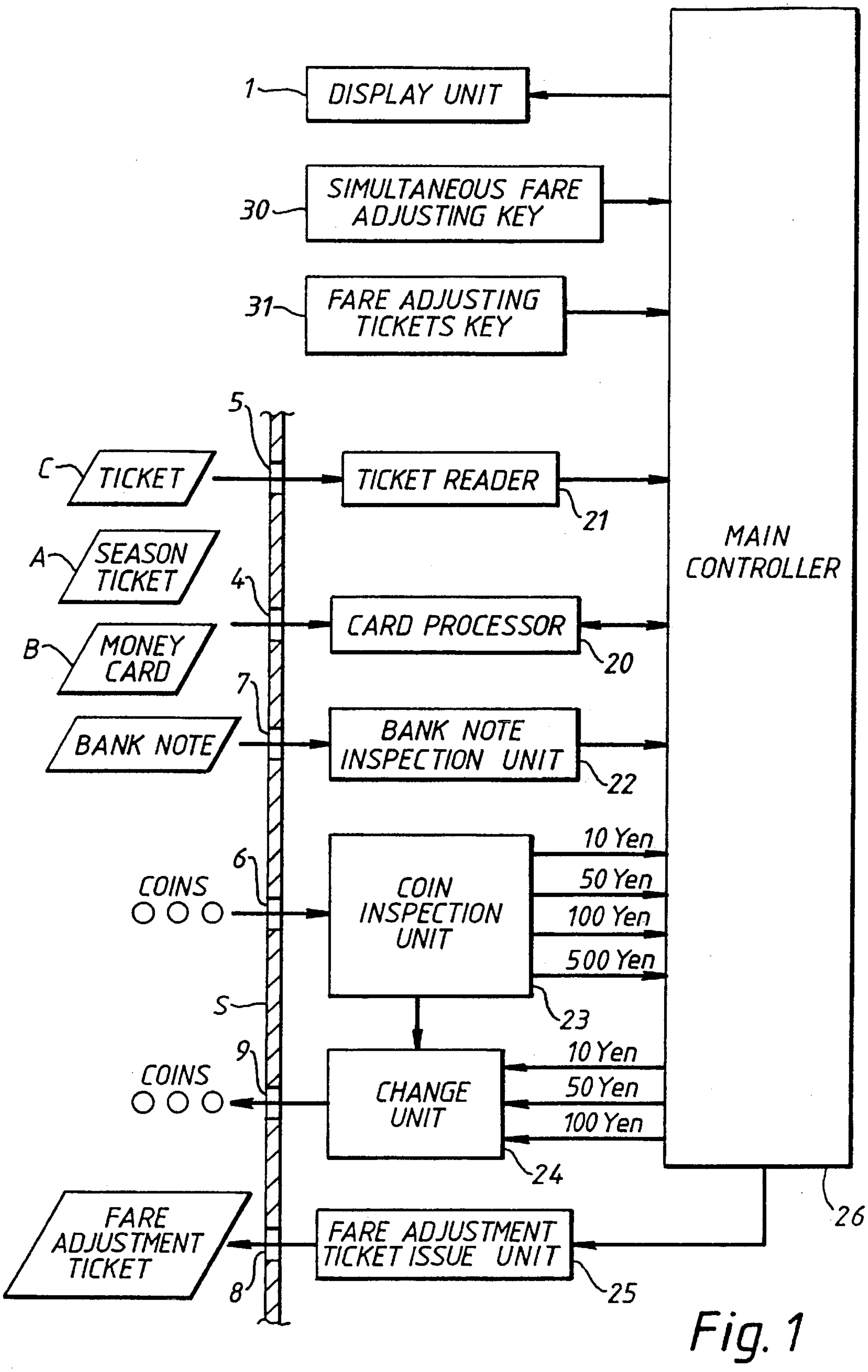
FIG. 1 is a block diagram showing an outline of an automatic addfare machine in a first embodiment of the present invention.

As shown in FIG. 1, a season ticket A or a cash card having a monetary value such as a prepaid card, etc. is inserted into the ticket/card inserting port 4. A ticket C is inserted into the ticket inserting port 5. Coins are inserted into the coin inserting port 6. Further, the ticket/card inserting port 4 and the ticket inserting port 5 may be combined into one common inserting port. Into the bank note inserting port 7, bank notes are inserted. Further, if a user canceled the fare adjustment or inserted bank notes cannot be identified, bank notes are discharged from the bank not inserting port 7. From the fare adjustment ticket issue port 8, an exit ticket (a fare adjustment ticket) is issued. From the change outlet 9, changes are released. From the season ticket/card outlet 10, a season ticket A and a cash card B are discharged. From the ticket outlet 11, a ticket C which is inserted into the ticket inserting port 5 is discharged to return to user when the user cancels the fare adjustment by pushing the cancel button 3.

On the back of the season ticket A, cash card B1 and ticket C, the magnetic recording portion is provided to record required information such as type of card/ticket, available period, used fare, riding section, entry station, residual amount, residual number of times, adult/child information indicating the user being adult or child, etc.

FIG. 1 shows the construction of an automatic addfare machine provided with the user servicing panel S as described above. That is, the card inserting port 4 is connected to a card processor 20 and the ticket inserting port 5 is connected to a ticket reader 21.

The bank note inserting port 7 is connected to a bank note inspection unit 22. The coin inserting port 6 is connected to a coin inspection unit 23 to which a change unit 24 is connected. Coins discriminated in the coin inspection unit 23 are stocked in the change unit 24 as changes and released to users through the change outlet 9 when changes are needed. A note detecting means for detecting a bank note is provided in the bank note inspection unit 22 and a coin detecting means for detecting a coin is provided at the coin inserting port 6.

Further, a fare adjustment ticket issue unit 25 is connected to the fare adjustment ticket issue port 8. This fare adjustment ticket issue unit 25 comprises a printer and a conveyer. That is, a fare adjustment ticket (an exit ticket) is printed in the printing portion, convoyed to the fare adjustment ticket issuing port 8 and released to the outside from the fare adjustment ticket issuing port 8.

The ticket reader 21, card processor 20, bank note inspection unit 22, coin inspection unit 23, change unit 24, issuing unit 25 and display unit 1 are all controlled by a main controller 26. The main control unit 26 is controlled by, for instance, a microcomputer, its peripheral circuits, etc. and controls the entire automatic addfare machine.

The ticket reader 21 has a tentative reserving unit and after reading magnetic information of a ticket requiring the fare adjustment out of tickets C, keep a ticket requiring the fare adjustment in the tentative reserving unit and reads next ticket requiring the fare adjustment. This operation is repeated for tickets requiring the fare adjustment for plural passengers.

Further, one ticket should be inserted at a time for the addfare adjustment but it becomes possible to insert plural tickets collectively if the inserting port is made more wide or a ticket alignment portion is provided.

The main controller 26 calculates an addfare amount of each of plural tickets requiring the fare adjustment according to the contents of read information of respective tickets and also calculates a total addfare amount of plural tickets and displays an addfare amount of each ticket and a total addfare amount of plural tickets on the display unit 1.

Figure 3A:
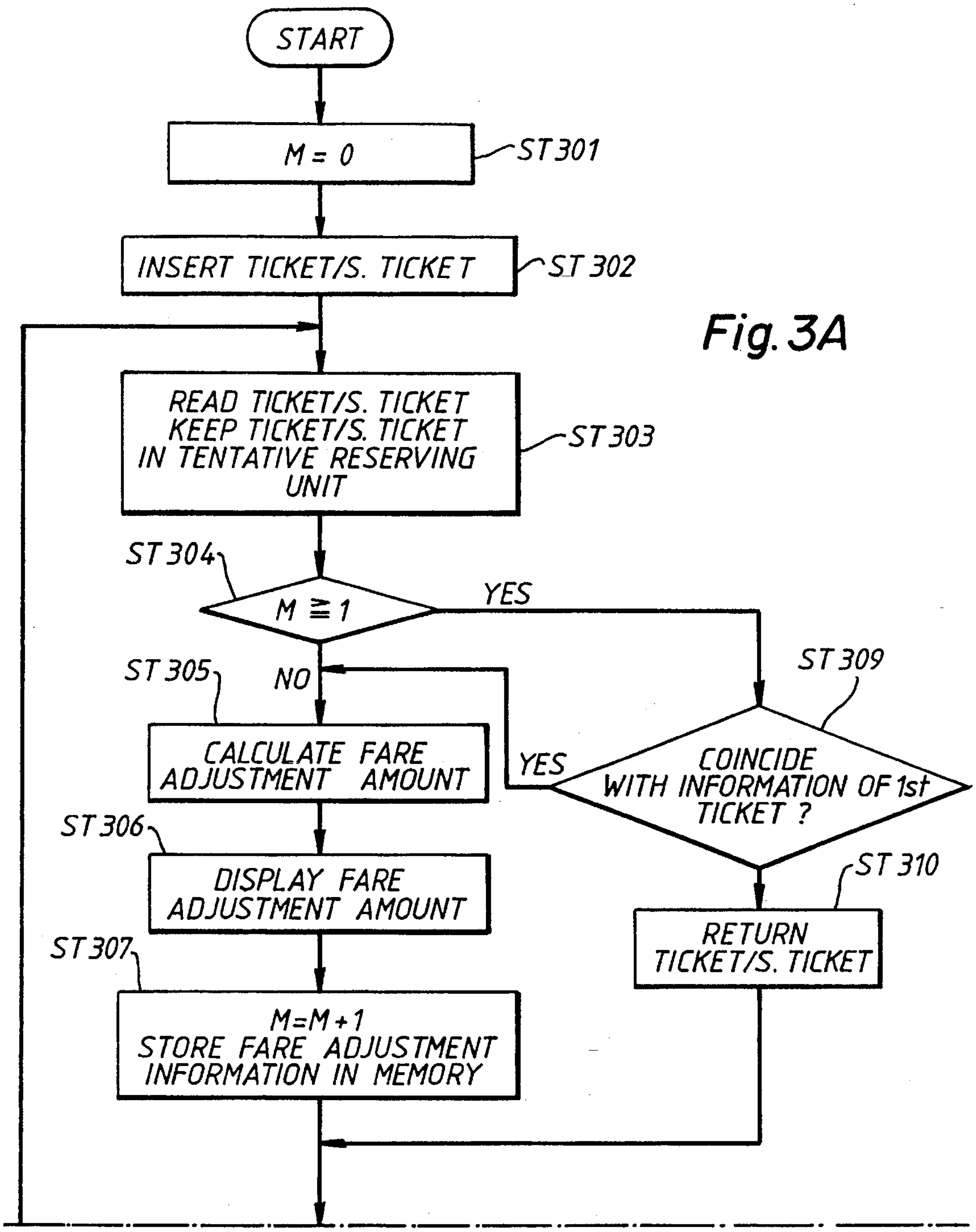
FIG. 3 is a flowchart for explaining a fare adjustment process of the automatic addfare machine shown in FIG. 1.
Figure 3B:
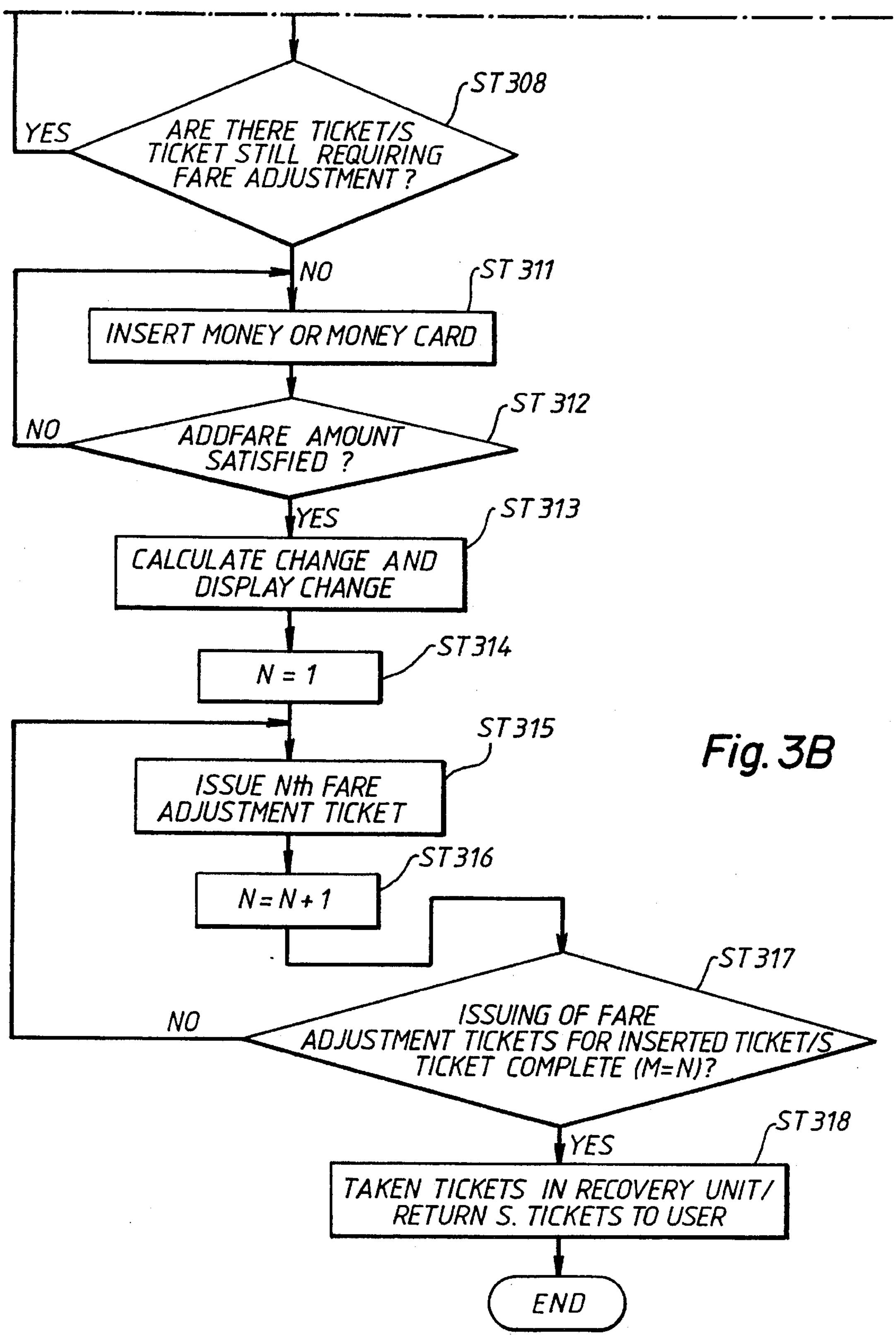

Next, the fare adjustment process of the automatic addfare machine in the construction as described above will be described referring to the flowchart shown in FIG. 3.

Now, the fare adjustment process will be explained taking an example of a case at a destination station on a route. At the destination station, at which passengers got off, a representative of plural passengers of a group or a family inserts tickets C requiring the fare adjustment into the ticket inserting port 5 in order. On each of the tickets C, any information concerning a departure station are recorded at the departure station at which a passenger got on. As an initialization of the machine, the number M of acceptable tickets C is set to "0", previously (ST301).

When a ticket or card requiring the fare adjustment, for instance. a first season ticket A or ticket C is inserted into the ticket inserting port 5 (ST302), sectional information of this first season ticket A or ticket C is read by the ticket reader 21 and the read result is output to the main controller 26. After reading of data by the ticket reader 21, the first season ticket A or ticket C is kept in the tentative reserving unit (ST303). Based on the acceptable ticket number M is "0", the main controller 26 calculates a fare adjustment amount according to the read contents of data recorded on the season ticket A or ticket C (ST304 and ST305). The fare adjustment amount is determined by calculating a fare corresponding to a section corresponded to an excess distance from the destination station at which the addfare machine is installed to the destination station recorded on the season ticket A or ticket C via the shortest distance. Further, the main controller 26 displays a guidance "An addfare amount is 100 Yen. Insert cash or a cash card. If you have another ticket requiring the fare adjustment, insert it in succession." on the display unit 1 (ST306). The main controller 26 has a memory (not shown) to store fare adjustment information including sectional information, addfare amount and adult/child information, which represents the kind of ticket whether it is used for adult or child, corresponding to Mth acceptable ticket. The main controller 26 displays the addfare amount in step ST306 and stores the fare adjustment information in the memory. At the same time, the main controller 26 incrments the acceptable ticket number M (ST307). As a result, the addfare machine became in the waiting state for receiving next season ticket A or ticket C requiring the fare adjustment.

When a second season ticket A or ticket C is inserted into the ticket inserting port 5 according to the guidance presented in Step ST306, the main controller 26 detects the insertion of season ticket A or ticket C and judges that there is still ticket requiring the fare adjustment (ST308: YES). Sectional information and other data of this second season ticket A or ticker C are read by the ticket reader 21 and the read result is output to the main controller 26. The second season ticket A or ticket C of which data is read by the ticket reader 21 is kept in the tentative reserving unit (ST303). In this time, since the acceptable ticket number M is "1", a first sectional information of the first season ticket A or ticket C is compared with a second sectional information of the second sason ticket A or ticket C (ST304 and ST309). If the first sectional information coincides with the second sectional information (ST309: YES), the main controller 26 calculates an addfare amount according to the read contents of the second season ticket A or ticket C (STS02) based on the second sectional information same as the first season ticket A or ticket C. At the same time, the main controller 26 calculates a total addfare amount by adding the addfare amount of the first ticket A or C and second ticket A or C (ST305). When the fares are different between adult and child, the calculated addfare amount may be quoted to obtain an addfare amount for the adult and an addfare amount for the child based on an adult/child information recorded on the ticket. The main controller 26 further displays the guidance "The addfare amount of the first ticket is 100 Yen and the addfare amount of the second ticket is 50 Yen. Total addfare amount is 150 Yen (ST306). Insert cash or a cash card. If you have another ticket requiring the fare adjustment, please insert it in succession. Further, the main controller 26 inclements the acceptable ticket number M to "2". The main controller 26 is again put in the state to make a judgment as to whether there are sill tickets requiring the fare adjustment (ST308).

Thereafter, when a third and subsequent season tickets A or tickets C requiring the fare adjustment are inserted, the machine operates similar to the steps described above.

If a sectional information of the subsequent ticket requiring the fare adjustment differs from the sectional information of the first ticket in the step ST309, the subsequent ticket will be returned to the user (ST310).

In step ST308. if the main controller 26 judges that no ticket requiring the fare adjustment is inserted since tickets requiring the fare adjustment are no longer, a bank note is inserted into the bank note inserting port 7 or coins into the coin inserting port 6 (ST311). At this time, the amount of the inserted bank note is detected by the bank note inspecting unit 22 or the amount of coins is detected by the coin inspection unit 23. These detected amounts are output to the main controller 26. Until the addfare amount is reached, the main controller 26 monitors amounts of inserted bank note and/or coins (ST312). As a result of the monitoring, if the addfare amount is satisfied (ST312: YES), the main controller 26 calculates the amount of change by deducting the addfare amount from the amount of inserted bank note/coins and displays it on the display unit 1 (ST313).

The main controller 26 directs the issuing unit 25 to issue the number of fare adjustment tickets corresponding to the number of tickets required the fare adjustment. At this time, a number N of ticket required the fare adjustment is set as "1" (ST314). Based on the fare adjustment information corresponding to the number N of ticket required the fare adjustment, a fare adjustment ticket is issued by the issuing unit 25 and released to the user through the fare adjustment ticket issuing port 8 (ST315). At this time, if changes are needed, the change unit 24 operates and released to a user through the change outlet 9. At each time of the issuing of fare adjustment ticket, the main controller 26 increments the number N one by one, and the issuing of fare adjustment tickets are performed until the number N of ticket required the fare adjustment coincides with the acceptable ticket number M (ST315, ST316 and ST317). Further, the tickets C inserted by a user and kept in the tentative reserving unit are taken in a ticket recovery unit (not shown) in the automatic addfare machine (ST318).

If a money card B is inserted through the card inserting port 4 instead of bank notes or coins (ST311), data of the money card B is read by the card processor 20 and a residual amount of the money card B is output to the main controller 26. Comparing the residual amount of the money card B with the addfare amount, the main controller 26 calculates a residual amount by deducting the addfare amount from the residual amount of the money card B and displays it on the display unit 1 (ST313). A new residual amount is written on the money card B by the card processor 20 and the money card B with a new residual amount written is released through the season ticket/card outlet 10 to a user.

The tickets C inserted by a user and kept in the tentative reserving unit are recovered in the recovery unit (not shown) in the automatic addfare machine.

If plural season tickets A are inserted into the card inserting port 4 for the fare adjustment, the plural season tickets A are kept at the tentative reserving unit. The plural season ticket A are returned from the tentative reserving unit to a user through the season ticket/card outlet 10 after completing the addfare operation (ST318).

If plural season tickets A and tickets C are inserted into the card inserting port 4 and the ticket inserting port 5 for the fare adjustment, they are processed in the same manner as the ticket C as described above.

Further, if the cancel button 3 is pushed by a user during the addfare operation, tickets requiring the fare adjustment kept in the tentative reserving unit are returned to a user through the ticket outlet 11.

As described above, plural tickets are received, a total addfare amount of these tickets is calculated and displayed, the fare adjustment is made for the total amount and after the fare adjustment, the fare adjustment tickets corresponding to the number of received tickets are issued.

Thus, the fare adjustment for plural tickets can be made simultaneously.

Figure 4A:
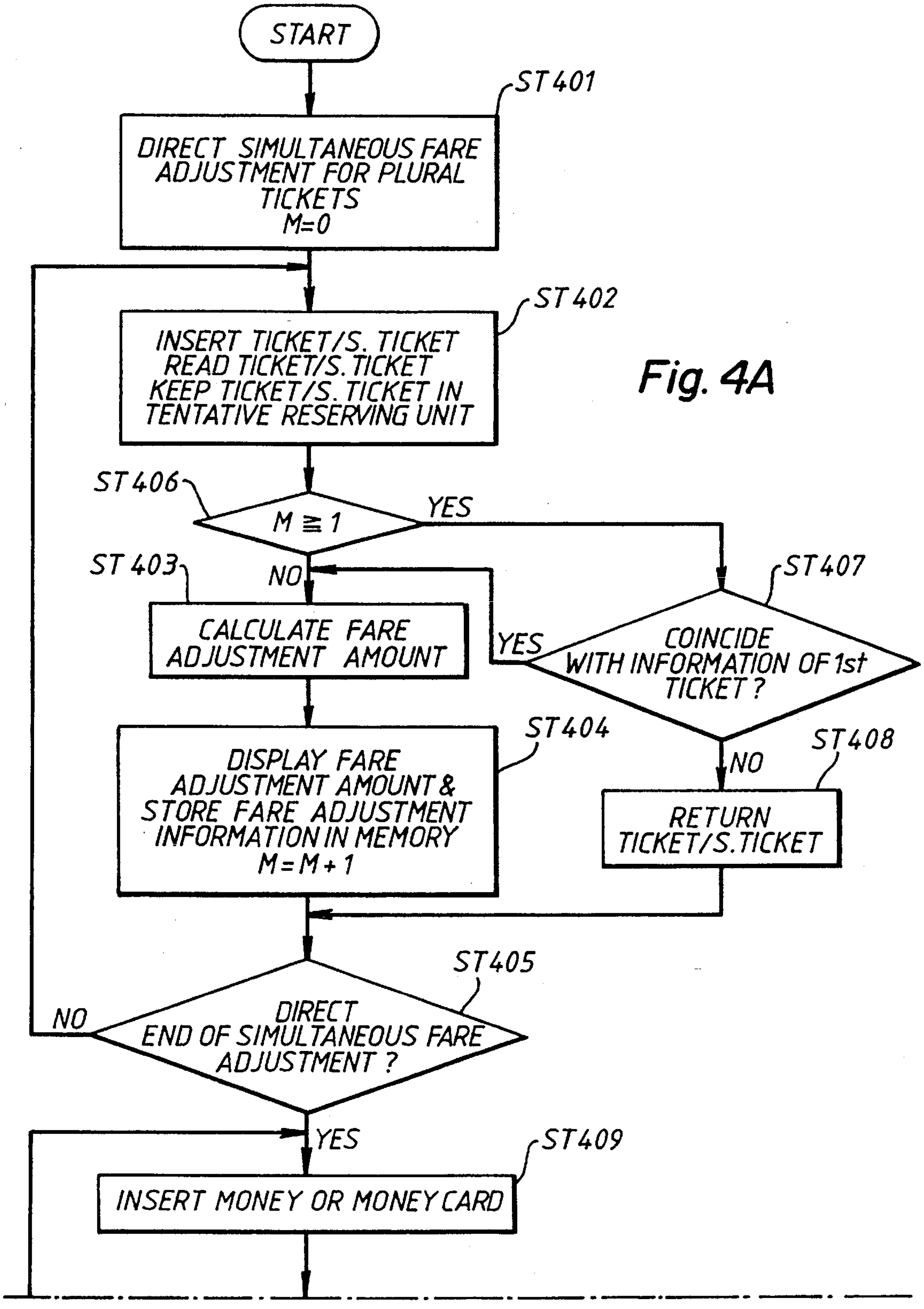
FIG. 4 is a flowchart for explaining the fare adjustment process of the automatic addfare machine in a second embodiment of the present invention.
Figure 4B:
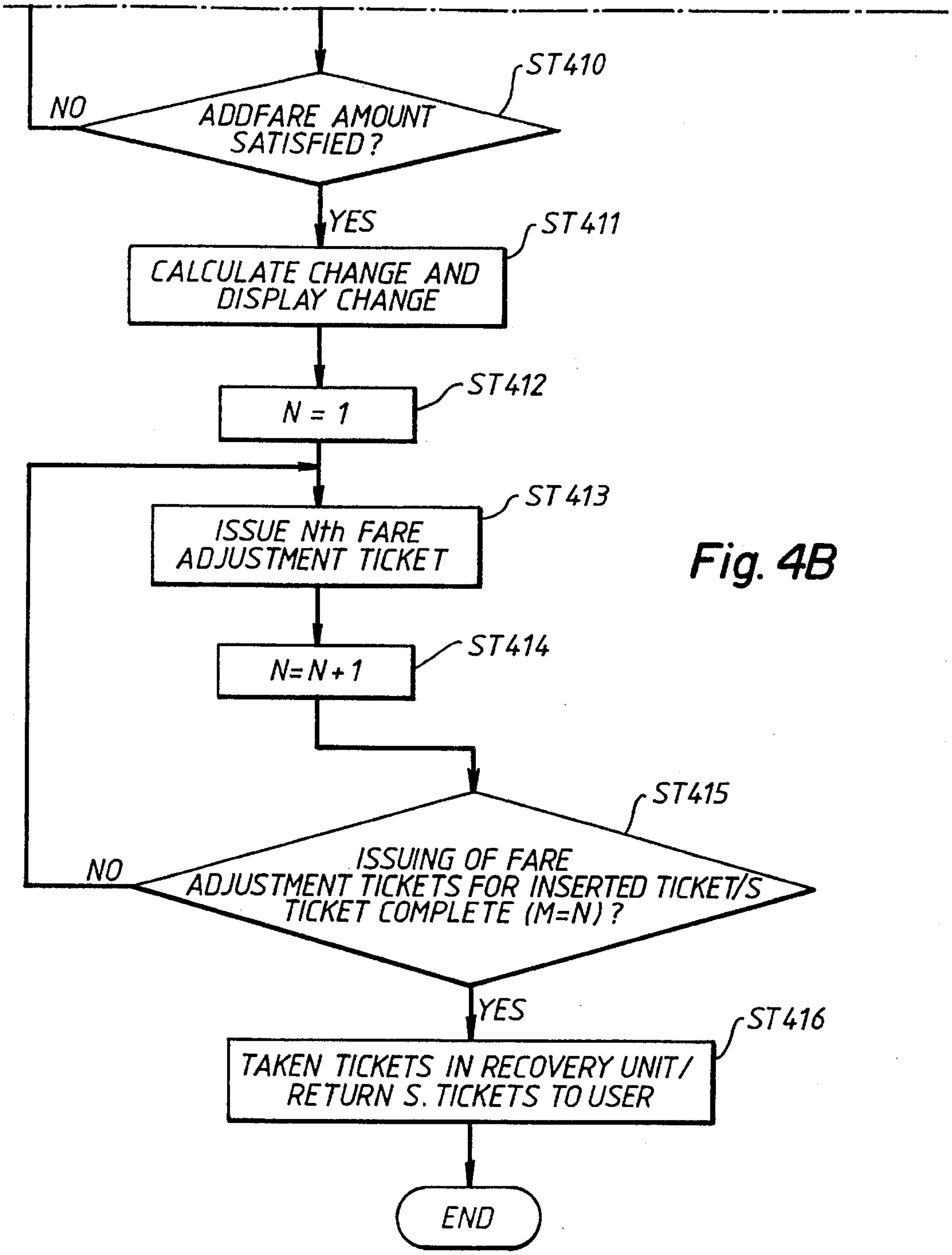

Next, a second preferred embodiment of the present invention will be described referring to FIG. 4, where the simultaneous fare adjustment for plural tickets are directed and the end of insertion of plural tickets for the simultaneous fare adjustment is directed.

As shown in FIG. 2, a simultaneous fare adjusting key 30 is provided on the user service panel. This fare adjusting key 30 is of lamp built-in type and once pushed, the built-in lamp lights to show ON and when pushed again, the built-in lamp is turned off to show OFF. When the simultaneous fare adjusting key 30 is turned ON as pushed by a user, it directs the simultaneous fare adjustment for plural tickets. When the simultaneous fare adjusting key 30 is turned OFF as pushed again, it directs the end of insertion of plural tickets requiring the simultaneous fare adjustment. The fare adjusting operation using this simultaneous fare adjusting key 30 is shown in the flowchart in FIG. 4.

That is, a representative of a group or a family pushes the simultaneous fare adjusting key 30 to turn ON to direct the simultaneous fare adjustment of plural tickets. At the same time, the number M of acceptable tickets A or C is set to "0" (ST401). When the simultaneous fare adjusting key 30 is pushed, the built-in lamp lights to show the ON state. Then, when a first season ticket A or ticket C (hereinafter referred as "a passenger ticket") is inserted into the ticket inserting port 5, data such as sectional information of this inserted first passenger ticket is read by the ticket reader 21 and the read result is output to the main controller 26. The first passenger ticket of which data is read by the ticket reader 21 is kept in the tentative reserving unit (ST402). The main controller 26 calculates an addfare amount according to the read content of the data recorded on the passenger ticket (ST403). Further, the main controller 26 displays a guidance "The addfare amount is 100 Yen. Insert cash or a money card. If you have another passenger ticket requiring the fare adjustment, please insert it in succession." At this time, the main controller 26 stores the fare adjustment information in the memory and incrments the acceptable ticket number M (ST404). Then, the main controller 26 is put in the state to make a judgment as to whether the simultaneous fare adjusting key 30 is pushed to turn OFF and the end of the simultaneous fare adjustment is directed (ST405).

If the simultaneous fare adjusting key 30 is not pushed and a second passenger ticket is inserted into the ticket inserting port 5 in the ON state (ST405: NO), such data as sectional information of the inserted second passenger ticket is read by the ticket reader 21 and the read result is output to the main controller 26. The second passenger ticket of which data is read by the ticket reader 21 is kept in the tentative reserving unit (ST402). In this time, since the acceptable ticket number M is "1", a first sectional information of the first passenger ticket is compared with a second sectional information of the second passenger ticket (ST406 and ST407). If the first sectional information coincides with the second sectional information (ST407; YES), the main controller 26 calculates an addfare amount according to the read contents of the second passenger ticket based on the second sectional information. At the same time, the main controller 26 calculates a total addfare amount by adding the addfare amount of the first passenger ticket and second passenger ticket (ST403). Further, the main controller 26 displays a guidance "The addfare amount of the first passenger ticket is 0.100 and the addfare amount of the second passenger ticket is 100 Yen. The total addfare amount is 200 Yen. Please insert cash or a money card. If you have another passenger ticket requiring the fare adjustment, please insert it in succession." (ST404). Then, the main controller 26 is put in the state to make a judgment as to whether the simultaneous fare adjusting key 30 is pushed to turn OFF and the end of the simultaneous fare adjustment is directed (ST405).

Thereafter, if the simultaneous fare adjusting key 30 is not pushed and a third and subsequent passenger tickets are inserted in the ON state (ST405: NO), the same operation as described above is executed.

If a sectional information of the subsequent passenger ticket requiring the fare adjustment differs from the sectional information of the first passenger ticket in the step ST407, the subsequent passenger ticket will be returned to the user (ST408).

If a user has no more ticket requiring the fare adjustment and pushes the simultaneous fare adjusting key 30, the end of the simultaneous fare adjustment of plural passenger tickets is directed (ST405: YES). Then, a user who has so far inserted plural passenger tickets requiring the fare adjustment inserts a bank note through the bank note inserting port 7 or coins through the coin inserting port 6 (ST409).

When a bank note is inserted through the bank note inserting port 7, the bank note inspection unit 22 detects the amount of the inserted bank note or when coins are inserted through the coin inserting port 7, the coin inspection unit 23 detects the amount of the inserted coins. These detected amounts are output to the main controller. Until the addfare amount is reached, the main controller 26 monitors amounts of the inserted bank note and coins (ST410). If the amount of inserted money satisfies the addfare amount as a result of the monitoring (ST410: YES), the main controller 26 calculates an amount of change by deducting the addfare amount from the inserted cash amount and displays it on the display unit 1 (ST411).

Then, the main controller 26 directs the issue unit 25 to issue the number of fare adjustment tickets corresponding to the number of tickets required the fare adjustment. At this time, a number N of ticket required the fare adjustment is set as "1" (ST412). Based on the fare adjustment information corresponding to the number N of passenger ticket required the fare adjustment, a fare adjustment ticket is issued by the issuing unit 25 and released to the user through the fare adjustment ticket issuing port 8 (ST413). At this time, if changes are needed, the change unit 24 operates to release change coins to a user through the change outlet 9. At each time of the issuing of fare adjustment ticket, the main controller 26 increments the number N one by one, and the issuing of fare adjustment tickets are performed until the number N of ticket required the fare adjustment coincides with the acceptable ticket number M (ST413, ST414 and ST415). Further, the passenger tickets inserted by a user and kept in the tentative reserving unit are taken into the recovery unit (not shown) in the automatic addfare machine (ST416).

A money card B may be inserted instead of bank note and/or coins through the season ticket/card inserting port 4 (ST409). Data recorded on the money card B inserted through the season ticket/card inserting port 4 is read by the card processor 20 and a residual amount of the money card B is output to the main controller 26. Then, the main controller 26 compares the residual amount of the money card B with an addfare amount and if the residual amount is much more than the addfare amount, calculates a residual amount by reducing the addfare amount from the residual amount of the money card B, displays the residual amount after deducting the addfare amount on the display unit 1 (ST411). The money card B with a new residual amount written by the card processor 20 is released to a user through the season ticket/card outlet 10.

If plural season tickets A are inserted into the card inserting port 4, the plural season tickets A are kept at the tentative reserving unit. The plural season ticket A are returned from the tentative reserving unit to a user through the season ticket/card outlet 10 after completing the addfare operation (ST416).

In addition, in the case where plural season tickets A and tickets C are inserted into the season ticket/card inserting port 4 and the ticket inserting port 5 as tickets requiring the fare adjustment, they are processed in the same manner as described above.

Further, if the cancel button 3 is pushed by a user during the fare adjustment operation, the tickets requiring the fare adjustment kept in the tentative reserving unit are returned to the user through the ticket outlet 11.

As described above, plural tickets are received, a total addfare amount is calculated and displayed, the fare adjustment is executed for a total addfare amount and thereafter, plural fare adjusting tickets are issued corresponding to the number of tickets received.

Thus, the addfare processing for plural tickets can be performed simultaneously.

Next, a third embodiment of the present invention will be described referring to FIG. 5, where the simultaneous fare adjustment for plural tickets is directed and plural tickets requiring the fare adjustment are input.

Figure 5A:
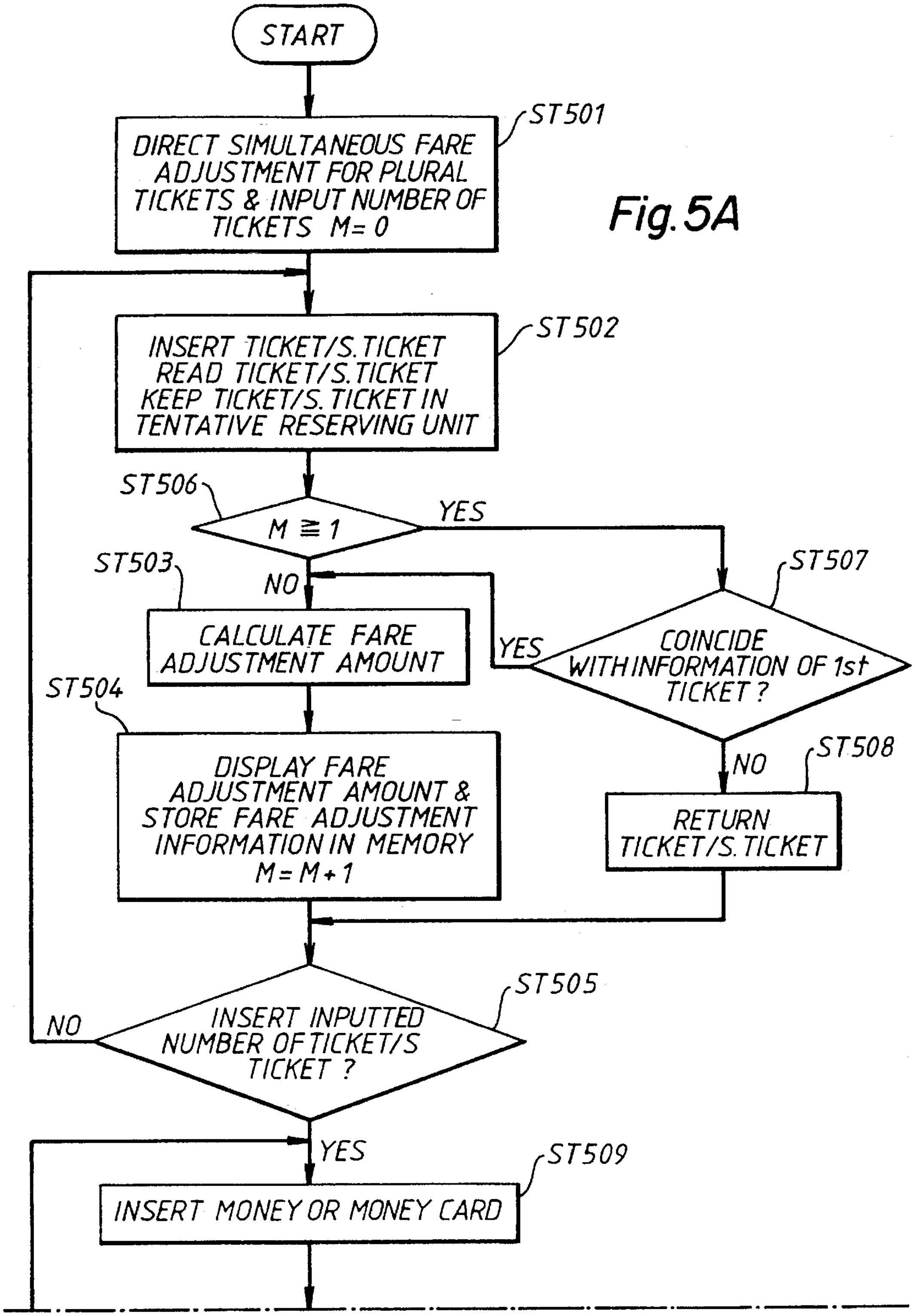
FIG. 5 is a flowchart for explaining the fare adjustment process of the automatic addfare machine in a third embodiment of the present invention.
Figure 5B:
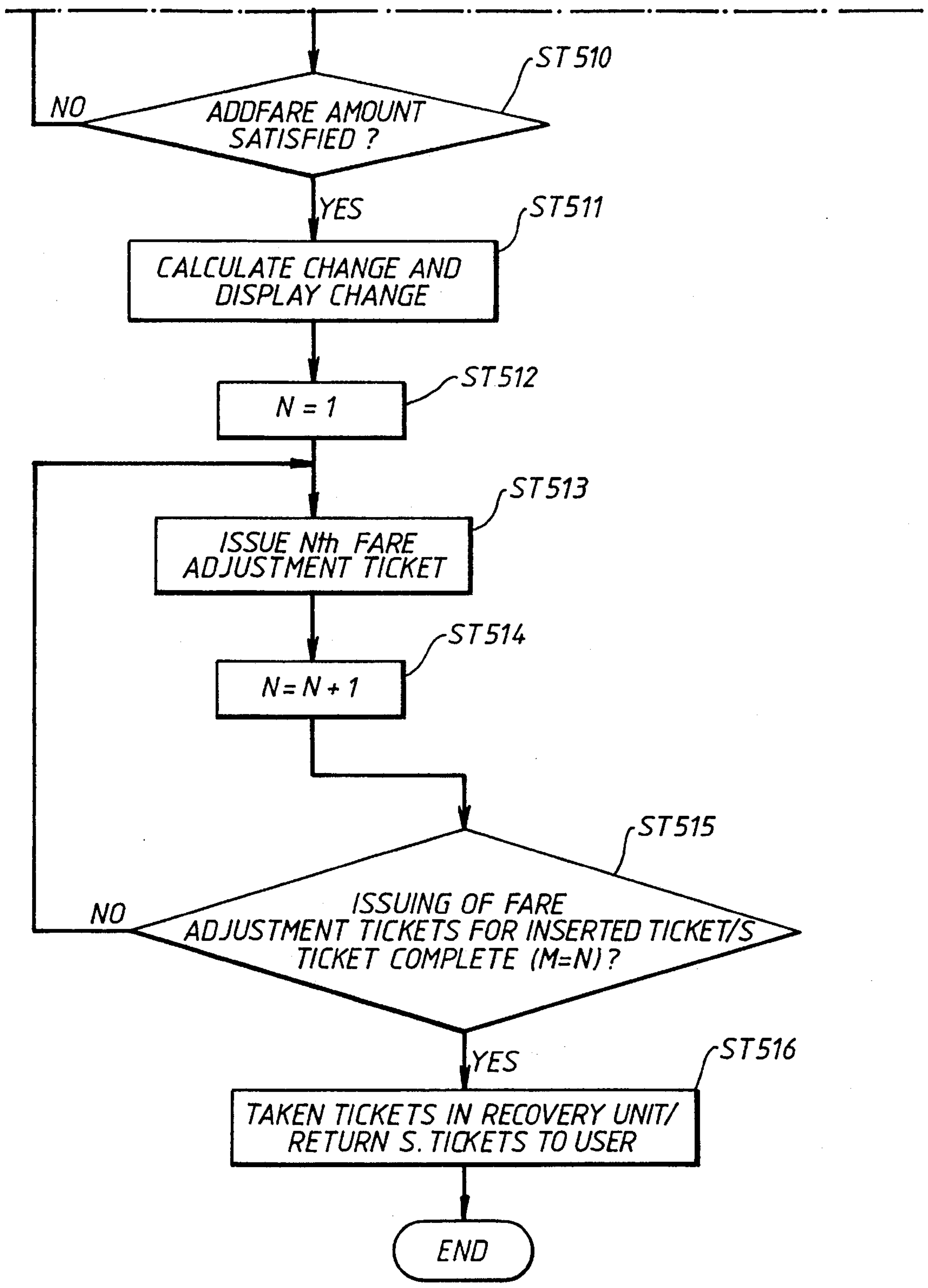

That is, as shown in FIG. 5, the simultaneous fare adjusting key 30 and the number of fare adjusting tickets key 31 are provided on the user servicing panel (FIG. 2). If this simultaneous fare adjusting key 30 is pushed, it becomes possible to input the number of tickets by the number of fare adjusting tickets key 31. The number of tickets set by the fare adjusting tickets key 31 are received and processed. The number of fare adjusting tickets key 31 of the third embodiment is composed of five numerical keys 1 to 5 arranged so that 1 through 5 sheets of ticket can be simultaneously processed for the fare adjustment. The fare adjustment operation using the simultaneous fare adjusting key 30 and the number of fare adjusting tickets key 31 is shown in the flowchart shown in FIG. 5.

That is, a representative of plural users, e.g., a group or a family pushes the simultaneous fare adjusting key 30 as a direction for the simultaneous fare adjustment of plural tickets. At this time, the acceptable ticket number M is set as "0". Then, he pushes, for instance, the key "3" of the number of fare adjusting tickets key 31 to set the simultaneous fare adjustment of 3 sheets of tickets (ST501). When the first season ticket A or ticket C (hereinafter reffered as "a passenger ticket") is inserted into the ticket inserting port 5, such data as sectional information of the first passenger ticket is read by the ticket reader 21 and the read result is output to the main controller 26. The first passenger ticket, after read its data by the ticket reader 21, is kept in the tentative reserving unit (ST502). According to the read content of the data recorded on the first passenger ticket, the main controller 26 calculates an addfare amount (ST503). Further, the main controller 26 displays the guidance "The addfare amount is 100 Yen. Please insert cash or a money card." on the display unit. At this time, the main controller 26 stores the fare adjustment information in the memory and increments the acceptable ticket number M (ST504). The main controller 26 judges whether the number of tickets inserted by a user has reached the number of tickets requiring the fare adjustment as set by the number of fare adjusting tickets key 31 (ST505), if it is not, the guidance "Please insert tickets requiring the fare adjustment in succession" on the display unit 1.

Further, when the second passenger ticket is inserted into the ticket inserting port 5, such data as sectional information recorded on the inserted second ticket is read by the ticket reader 21 and the read result is output to the main controller 26. The second ticket, after read its data by the ticket reader 21, is kept in the tentative reserving unit (ST502). In this time, since the acceptable ticket number M is "1", a second sectional information of the second passenger ticket is compared with a first sectional informaiton of the first passenger ticket (ST506 and ST507). If the second sectional information coincides with the first sectional information (ST507: YES), the main controller 26 calculates a addfare amount according to the read contents of the passenger ticket and calculates a total addfare amount by adding the addfare amount of first and second passenger tickets (ST503). Further, the main controller 26 displays a guidance "The addfare amount of the first ticket is 100 Yen, the addfare amount of the second ticket is 100 Yen, and the total addfre amount is 200 Yen. Please insert cash or a money card." on the display unit 1 (ST504). Further, the main controller 26 judges whether the number of tickets inserted by a user has reached the number of tickets requiring the fare adjustment as set by the number of fare adjusting tickets key 31 (ST505).

If the second sectional information does not coincide with the first sectional informatio at step ST508, the second passenger ticket will be returned to the user (ST508).

Further, when the third passenger ticket is inserted into the ticket inserting port 5, such data as sectional information recorded on the inserted third passegner ticket is read by the ticket reader 21 and the read result is output to the main controller 26. The third passenger ticket, after read its data by the ticket reader 21, is kept in the tentative reserving unit (ST502). At this time, a third sectional information of the third passenger ticket is compared with the first sectional informaiton of the first passenger ticket (ST507). If the third sectional information coincides with the first sectional information the main controller 26 calculates a addfare amount according to the read contents of the third passenger ticket and calculates a total addfare amount by adding the addfare amount of the first, second and third passenger tickets (ST503). Further, the main controller 26 displays a guidance "The addfare amount of the first ticket is 100 Yen, the addfare amount of the second ticket is 100 Yen, the addfare amount of the third ticket is 100 Yen, and the total addfare amount is 300 Yen. Please insert cash or a money card." on the display unit 1 (ST504).

When the issued number of fare adjusting tickets has been reached to the number of tickets "3" set by the number of tickets requiring the fare adjustment key 31, it is judged to be YES in ST505. That is, based on the last total addfare amount, a user will insert a bank note through the bank note inserting port 7 or coins through the coin inserting port 6 (ST509).

When a bank note is inserted, the amount of the inserted bank note is detected by the bank note inspection unit 22 or when coins are inserted through the coin inserting port 6, the coin inspection unit 23 detects the amount of coins. These detected amounts are output to the main controller 26. Until the addfare amount is reached, the main controller 26 continuously monitors amounts of the inserted bank note and coins (ST510). As a result of the monitor, when the addfare amount is satisfied (ST510: YES), the main controller 26 calculates an amount of change by deducting the addfare amount from the inserted amount and displays it on the display unit 1 (ST511).

The main controller 26 directs the issuing unit 25 to issue the fare adjusting tickets corresponding to the number of tickets required the fare adjustment. At this time, a number N of ticket required the fare adjustment is set as "1". Based on the fare adjustment inoformation corresponding to the number N of passenger ticket required the fare adjustment, a plural of fare adjustment tickets are by the issuing unit 25 and released to a user through the fare adjustment ticket issuing port 8 (ST513). At this time, if changes are needed, the change unit 24 operates to release change coins to a user through the change outlet 9. At each time of the issuing of fare adjustment ticket, the main controller 26 increments the number N one by one, and the issuing of fare adjustment tickets are performed until the number N of ticket required the fare adjustment coincides with the acceptable ticket number M (ST513, ST514 and ST515). The passenger tickets inserted by a user and kept in the tentative reserving unit are taken into the ticket recovery unit (not shown) in the automatic addfare machine (ST516).

A money card B may be inserted for a bank note or coins from the season ticket/card inserting port 4 (ST509). Data recorded on the money card B inserted through the season ticket/card inserting port 4 is read in the card processor 20 and the residual amount of the money card B is output to the main controller 26. Then, the main controller 26 compares the residual amount with the addfare amount and if the residual amount is much more than the addfare amount, calculates a new residual amount after deducting the addfare amount from the residual amount recorded on the money card B, and displays it on the display unit 1 (ST508), and the money card B with a new residual amount written by the card processor 20 is released to a user through the season ticket/card outlet 10.

If plural season tickets A are inserted into the card inserting port 4, the plural season tickets A are kept at the tentative reserving unit. The plural season ticket A are returned from the tentative reserving unit to a user through the season ticket/card outlet 10 after completing the addfare operation (ST516).

Further, in the case where plural season tickets A and tickets C are inserted into the season ticket/card inserting port as those requiring the fare adjustment, they are also processed in the same manner as in the ticket C.

In addition, if the cancel button 3 is pushed by a user during the fare adjustment process, the tickets kept in the tentative reserving unit for the fare adjustment are returned to the user from the ticket outlet 11.

As described above, plural tickets are received, a total addfare amount of tickets is calculated and displayed, the total addfare adjustment is made and after the addfare adjustment, the fare adjustment tickets for the number of tickets received are issued.

Thus, the fare adjustment process can be executed simultaneously for plural tickets.

What is claimed is:

1. An automatic addfare machine comprising:

first receiving means for receiving in order first and second passenger tickets being respectively recorded sectional information representing a prescribed section between a station and the other station on a route:

means for reading respective sectional information recorded on the first and second passenger tickets received by the first receiving means:

means for comparing the sectional information of the first and second passenger tickets read by the reading means and outputting a comparison result:

means for calculating a total addfare amount of the first and second passenger tickets based on the sectional information as far as a destination station at which the addfare machine is installed when the comparison result indicates that the sectional information of the second passenger ticket coincides with the sectional information of the first passenger ticket;

second receiving means for receiving currency; and means for issuing fare adjustment tickets in the number of sheets equivalent to the passenger tickets received by the first receiving means when an amount of the currency received by the second receiving means is much more than the total addfare amount.

2. The machine as claimed in claim 1 further comprising means for returning the second passenger ticket when the comparison result indicates that the sectional information of the second passenger ticket does not coincide with the sectional information of the first passenger ticket.

3. The machine as claimed in claim 1 further comprising a user servicing panel to face a user and wherein the first receiving means includes a ticket inserting port formed on the used servicing panel so that the first and second passenger tickets can be inserted by the used.

4. The machine as claimed in claim 1 further comprising a user servicing panel to face a user and wherein the first receiving means includes a season ticket inserting port formed on the user servicing panel so that plural season tickets can be inserted by the user.

5. The machine as claimed in claim 1 further comprising a user servicing panel to face a user, the user servicing panel including a display unit for displaying the total addfare amount to the user.

6. The machine as claimed in claim 1 further comprising a user servicing panel to face a user, the user servicing panel including a cancel button to be operated by the user for canceling the fare adjustment.

7. The machine as claimed in claim 6, wherein the user servicing panel includes a ticket outlet for returning the passenger tickets received by the first receiving means to the user when the cancel button is operated by the user.

8. The machine as claimed in claim 1 further comprising a user servicing panel to face a user, the user servicing panel including a bank note inserting port for inserting a bank note, a coin inserting port for inserting a coin and a trading medium inserting port for inserting a trading media having monetary values so that currency such as bank notes, coins or trading media having monetary values can be inserted by the user.

9. The machine as claimed in claim 1 further comprising a user servicing panel to face a user and wherein the issuing means includes a fare adjustment ticket issuing port formed on the user servicing panel for releasing the issued fare adjustment tickets to the user.

10. The machine as claimed in claim 1, wherein the calculating means includes:

first calculation means for calculating a first addfare amount of the first passenger ticket based on the sectional information of the first passenger ticket as far as the destination station;

second calculation means for calculating a second addfare amount of the second passenger ticket when the comparison result indicates that the sectional information of the second passenger ticket coincides with the sectional information of the first passenger ticket; and third calculation means for adding the second addfare amount of the second passenger ticket to the first addfare amount of the first passenger ticket to obtain the total addfare amount.

11. The machine as claimed in claim 1 further comprising means for detecting whether the first receiving means receives a passenger ticket or the second receiving means receives the currency after the first receiving means has received a plurallity of passenger tickets, and wherein the issuing means includes means for issuing the fare adjustment tickets in the number of sheets equivalent to the passenger tickets received by the first receiving means when the detecting means detects that the second receiving means receives currency and when an amount of the currency received by the second receiving means is much more than the total addfare amount.

12. The machine as claimed in claim 1 further comprising:

first direction means for directing to start a simultaneous fare adjustment processing for plurallity of passenger tickets; and second direction means for directing to end of the simultaneous fare adjustment processing for the plurallity of passenger tickets directed by the first direction means;

wherein the issuing means includes means for issuing the fare adjustment thickets in the number of sheets equivalent to the passenger tickets received by the first receiving means when the second direction means directs to end of the simultaneous fare adjustment processing for the plurallity of passenger tickets and when an amount of the currency received by the second receiving means is much more than the total addfare amount.

13. The machine as claimed in claim 12 further comprising a user servicing panel to face a user and wherein the first direction means includes a key formed on the user servicing panel to be operated by the user.

14. The machine as claimed in claim 12 further comprising a user servicing panel to face a user and wherein the second direction means includes a key formed on the user servicing panel to be operated by the user.

15. The machine as claimed in claim 1 further comprising:

direction input means for directing to start a simultaneous fare adjustment processing for plural passenger tickets and inputting the number of passenger tickets requiring the simultaneous fare adjustment processing;

means for counting the number of passenger tickets read by the reading means;

means for judging whether the number of passenger tickets counted by the counting means has reached the number of passenger tickets input by the direction input means; and means for displaying a guidance to urge the user to insert currency to the second receiving means when the judging means judges the number of passenger tickets counted by the counting means has reached the number of passenger tickets input by the direction input means.

16. The machine as claimed in claim 15 further comprising a user servicing panel to face a user and wherein the direction input means includes key means formed on the user servicing panel for being operated by the user.

17. The machine as claimed in claim 16, wherein the key means includes a first key for directing the simultaneous fare adjustment and a second key composed of numerical keys provided for directing the number of tickets requiring the fare adjustment.

18. An automatic addfare machine comprising:

first receiving means for receiving in order first and second passenger tickets being respectively recorded sectional information representing a prescribed section between a station and the other station on a route;

means for reading respective sectional information recorded on the first and second passenger tickets received by the first receiving means;

means for comparing the sectional information of the first and second passenger tickets read by the reading means and outputting a comparison result;

first calculation means for calculating in order an addfare amount of the first and second passenger tickets based on the sectional information as far as a destination station at which the addfare machine is installed;

second calculation means for adding the addfare amount of the second passenger ticket to the addfare amount of the first passenger ticket to obtain a total addfare amount when the comparison result indicates that the sectional information of the second passenger ticket coincides with the sectional information of the first passenger ticket;

memory means for storing addfare information including the calculated addfare amount of the first and second passenger tickets in corresponding to the order of the calculation by the calculating means;

second receiving means for receiving currency such as bank notes and coins or trading media having monetary values; and means for issuing fare adjustment tickets corresponding to the addfare information in the order of the calculation by the calculating means based on the addfare information stored in the memory means when an amount of the currency received by the second receiving means or a monetary value of the trading medium received by the second receiving means is much more than the total addfare amount.

19. The machine as claimed in claim 18 further comprising means for returning the second passenger ticket to the user when the comparison result indicates that the sectional information of the second passenger ticket does not coincide with the sectional information of the first passenger ticket.

* * * * *